US010400947B2

United States Patent
Fu et al.

(10) Patent No.: US 10,400,947 B2
(45) Date of Patent: Sep. 3, 2019

(54) WALL MOUNTING APPARATUS AND DISPLAY DEVICE

(71) Applicants: Boe Technology Group Co., Ltd., Beijing (CN); Beijing Boe Multimedia Technology Co., Ltd., Beijing (CN)

(72) Inventors: Mancang Fu, Beijing (CN); Jigang Lv, Beijing (CN); Huijun Li, Beijing (CN); Haiyan Wan, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/524,221

(22) PCT Filed: Oct. 17, 2016

(86) PCT No.: PCT/CN2016/102268
§ 371 (c)(1),
(2) Date: May 3, 2017

(87) PCT Pub. No.: WO2017/067424
PCT Pub. Date: Apr. 27, 2017

(65) Prior Publication Data
US 2017/0356594 A1    Dec. 14, 2017

(30) Foreign Application Priority Data

Oct. 20, 2015  (CN) .......................... 2015 1 0683996

(51) Int. Cl.
*F16M 11/04* (2006.01)
*F16M 13/02* (2006.01)
(Continued)

(52) U.S. Cl.
CPC .......... *F16M 13/02* (2013.01); *F16M 11/046* (2013.01); *F16M 11/42* (2013.01); *H04N 5/655* (2013.01); *F16M 2200/08* (2013.01)

(58) Field of Classification Search
CPC .... F16M 13/02; F16M 11/42; F16M 2200/08; H04N 5/655
See application file for complete search history.

(56) References Cited

U.S. PATENT DOCUMENTS 6,941,691 B2 *  9/2005  Arko ................... G09F 15/0012
                                                         248/451
7,300,029 B2 * 11/2007  Petrick ................... F16M 11/10
                                                         248/285.1
(Continued)

FOREIGN PATENT DOCUMENTS

CN         2837987 Y      11/2006
CN       201032594 Y      3/2008
(Continued)

OTHER PUBLICATIONS

International Search Report and Written Opinion in PCT/CN2016/102268 dated Jan. 26, 2017, with English translation.
(Continued)

*Primary Examiner* — Anita M King
(74) *Attorney, Agent, or Firm* — Womble Bond Dickinson (US) LLP

(57) ABSTRACT

A wall mounting apparatus, which includes a base provided with a plurality of positioning holes; a plurality of wall mounting pieces, each wall mounting piece being detachably connected to one of the plurality of positioning holes. One or more wall racks, each including at least two through holes, and configured to be hanged on the base by way of a corresponding connection of the through hole with the wall mounting piece. Each of the wall racks further includes
(Continued)

Fig.5 members for securing the display. Moreover, a display device including such wall mounting apparatus is disclosed.

20 Claims, 4 Drawing Sheets

(51) Int. Cl.
  *F16M 11/42* (2006.01)
  *H04N 5/655* (2006.01)

(56) References Cited

U.S. PATENT DOCUMENTS

| | | | | |
|---|---|---|---|---|
| 7,334,762 | B2* | 2/2008 | Dittmer | F16M 11/041 248/221.11 |
| 7,380,765 | B2* | 6/2008 | Shiff | A47B 97/04 248/124.1 |
| 7,455,271 | B2* | 11/2008 | Pincek | F16M 11/14 248/220.21 |
| 7,726,617 | B2* | 6/2010 | Zambelli | F16M 11/041 248/222.12 |
| 8,979,049 | B2* | 3/2015 | Yoshida | F16M 13/02 248/224.51 |
| 2002/0179801 | A1 | 12/2002 | Kim | |
| 2008/0237434 | A1* | 10/2008 | Lin | F16B 43/00 248/497 |
| 2014/0166834 | A1* | 6/2014 | Kuroyanagi | F16M 13/02 248/231.91 |

FOREIGN PATENT DOCUMENTS

| | | |
|---|---|---|
| CN | 201310720 Y | 9/2009 |
| CN | 201401615 Y | 2/2010 |
| CN | 201606631 U | 10/2010 |
| CN | 201723943 U | 1/2011 |
| CN | 202125712 U | 1/2012 |
| CN | 202381952 U | 8/2012 |
| CN | 203099265 U | 7/2013 |
| CN | 203274266 U | 11/2013 |
| CN | 203297895 U | 11/2013 |
| CN | 203561069 U | 4/2014 |
| CN | 203572034 U | 4/2014 |
| CN | 103883861 A | 6/2014 |
| CN | 203641818 U | 6/2014 |
| CN | 105202339 A | 12/2015 |
| CN | 205173919 U | 4/2016 |

OTHER PUBLICATIONS

Office Action in Chinese Application No. 201510683996.5 dated Nov. 28, 2016, with English translation.
Office Action in Chinese Application No. 201510683996.5 dated Aug. 3, 2017, with English translation.
"Third office action," CN Application No. 201510683996.5 (dated Feb. 12, 2018).

* cited by examiner

WALL MOUNTING APPARATUS AND DISPLAY DEVICE

RELATED APPLICATIONS

The present application is the U.S. national phase entry of PCT/CN2016/102268, with an international filing date of Oct. 17, 2016, which claims the benefit of Chinese Patent Application No. 201510683996.5, filed on Oct. 20, 2015, the entire disclosures of which are incorporated herein by reference.

TECHNICAL FIELD

The present application relates to the display technical field, and more particularly to wall mounting apparatus and display device.

BACKGROUND

Flat-panel displays (eg, LCD televisions, plasma televisions, and liquid crystal displays) can be placed on the table and can be wall-mounted on the wall in order to enhance the integration with the ambient space. At present, before the flat panel display is attached to the wall, a wall rack is mounted on the back of the display through the screw holes (for example, four screw holes) on the back of the display, so that the body of the display is integrated with the wall rack and then the display is hanged on the wall through the wall rack. However, this wall-mounting solution requires the installation of a wall mounting piece cooperating with the wall rack at a set height of the wall. Since the height of the wall mounting piece cannot be adjusted after it is fixed to the wall, it is not possible to flexibly adjust the mounting height of the display. The complex design of the wall mounting structure of the wall rack and the wall mounting piece also leads to higher manufacturing costs.

SUMMARY

In order to solve the above problems, the present application provides the following solutions.

In one aspect, there is provided a wall mounting apparatus comprising: a base provided with a plurality of positioning holes; one or more wall mounting pieces, each of said wall mounting pieces being detachably connected to one of said plurality of positioning holes; multiple wall racks, each of said wall racks comprising at least two through holes and being configured to be hanged on the base by means of a corresponding connection of said through hole with said wall mounting piece, the multiple wall racks being substantially parallel to each other and hanged on the base, each of the wall racks further comprising means for securing the display. Each of the plurality of wall mounting pieces has a threaded portion which is substantially perpendicular to a front surface of the base, and orthographic projections of the threaded portions of the plurality of wall mounting pieces on the front surface of the base are spaced apart from each other.

In some embodiments, the base comprises at least six positioning holes, the at least six positioning holes being arranged in two rows; various through holes on each of said wall racks are equally spaced on a row; and the positioning holes located in a row are equally spaced, and the spacing between two adjacent positioning holes on one row is equal to the spacing between two adjacent through holes on one row.

In some embodiments, the base comprises a substrate and a front trim panel, the substrate and the front trim panel being detachably connected.

In some further embodiments, the substrate and the front trim panel are plate-like and the front trim panel is secured to the substrate by a connection between the positioning holes and the wall mounting pieces.

In some embodiments, the positioning hole is a threaded hole, the wall mounting piece having a threaded portion and a head portion connected to the threaded portion.

In some embodiments, the head portion of the wall mounting piece comprises a first flange located at an end of the wall mounting piece, a second flange adjacent to the threaded portion, and a hanging shaft located between the first flange and the second flange, and the first flange is dimensioned to be able to pass through the through hole and the second flange is dimensioned to be unable to pass through the through hole.

In some embodiments, the through hole of the wall rack is formed by interconnected mounting hole and limiting hole, wherein the mounting hole is located below the limiting hole and the size of the mounting hole is larger than the size of the limiting hole, the size of the mounting hole is larger than the size of the first flange and smaller than the size of the second flange, and the size of the limiting hole is larger than the size of the hanging shaft.

In some further embodiments, the edge of the first flange has a chamfer.

In some further embodiments, the first flange has at least two sides parallel to each other.

In some embodiments, the base further comprises legs for supporting the plate structure, the leg being provided with a roller.

In some embodiments, the wall rack comprises a bottom plane member and a top plane member protruding from the bottom plane member, wherein the through hole is formed in the bottom plane member, and the top plane member is provided with members for fixing the display.

In another aspect, there is provided a display device comprising a display and a wall mounting apparatus as described above.

In some embodiments, the display is secured to the wall rack of the wall mounting apparatus and the wall rack is able to be in one of a state of being hanged on the base and a state of being separated from the base.

The present application can have multi-stage mounting heights by cooperating of multiple independent wall mounting pieces and two wall racks. The embodiments configure the base to be capable of securing a plurality of (e.g., six) wall mounting pieces, the wall mounting pieces being arranged in two rows on the base, each of the two wall racks has two through holes, cooperating with the corresponding wall mounting pieces, to form a wall mounting assembly with different mounting heights, which can flexibly adjust the mounting height of the display. The embodiments also attaches the front trim panel to the substrate with the wall mounting pieces as the fastener, thereby simplifying the design of the wall mounting apparatus and saving the cost. The special mating structure of the wall mounting pieces and the wall racks according to the embodiments of the present application can be easily disassembled from the base and the wall racks are fixed on the wall mounting pieces in ways of suspension, so that the wall mounting apparatus can be flexibly adjusted.

Other features and advantages of the embodiments of the present application will be understood when reading the following description in conjunction with the accompanying drawings, wherein the drawings illustrate the principles of embodiments of the present application by way of example.

BRIEF DESCRIPTION OF THE DRAWINGS

By way of example, the foregoing and other aspects, features and benefits of the various embodiments of the present application will become more apparent from the following detailed description and the accompanying drawings.

DETAILED EMBODIMENTS

In the following, the principles and objects of the present application will be described with reference to examples. It is to be understood that the embodiments given are merely for those skilled in the art to better understand the present application and to further practice the present application and not to limit the scope of the present application. For example, features that are illustrated or described as part of one embodiment may be used in conjunction with another embodiment to produce still another embodiment.

Figure 1:
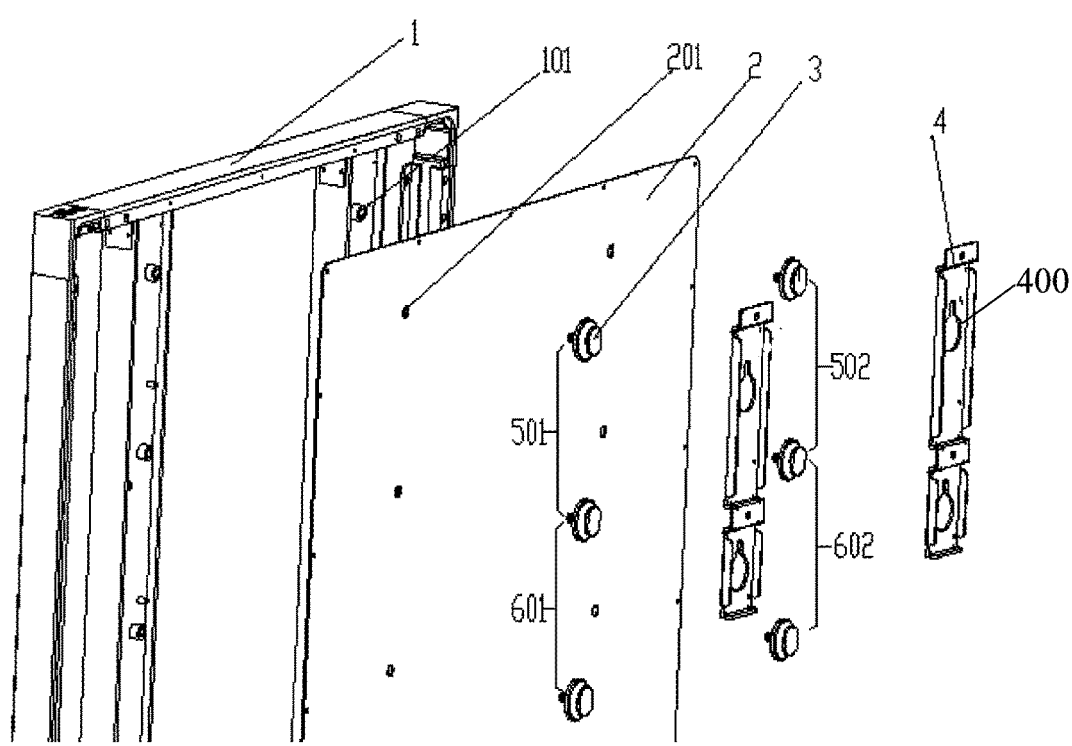
FIG. 1 is an exploded view showing the composition of a wall mounting apparatus according to at least one embodiment of the present application.

FIG. 1 is an exploded view showing the composition of a wall mounting apparatus (wall hanging apparatus or wall mount) according to an embodiment of the present application. As shown in FIG. 1, according to this embodiment, the wall mounting apparatus comprises a base constituted by the substrate 1 and the front trim panel 2. In FIG. 1, the substrate 1 and the front trim panel 2 are plate-like, and the substrate 1 comprises a groove having an opening. The front trim panel 2 is provided at the opening of the groove. A plurality of positioning holes 101 are provided in the substrate 1. Specifically, a plurality of positioning holes are provided at the bottom of the groove of the substrate 1.

The front trim panel 2 is provided with holes 201 corresponding to each of the positioning holes 101 respectively. In use, the substrate 1 and the front trim panel 2 are placed vertically and the front trim panel 2 is fixed to the positioning holes 101 provided in the substrate 1 through the holes 201 so that the front trim panel 2 just covers a closed rectangular base formed by the opening of the substrate 1 and the front trim panel 2.

The wall mounting apparatus also comprises a plurality of wall mounting pieces 3 corresponding to each of the positioning holes shown in FIG. 1 respectively, which wall mounting piece 3 is secured to the base by means of a corresponding one of the positioning holes 101. Preferably, the front trim panel 2 may be secured to the substrate 1 through, for example, a threaded connection of the hole 201 and the wall mounting piece 3, which is also a screw for example. In other words, the wall mounting piece 4 may extend through the hole 201 in the front trim panel 2 to the positioning hole 101 inside the substrate 1 to fix the front trim panel 2 and the substrate 1.

The wall mounting apparatus also comprises a plurality of wall racks 4, each of which comprises an upper and a lower through holes 400. The two through holes 400 may cooperate with corresponding two wall mounting pieces 3 to secure the wall rack 4 relative to the base, i.e., hang the wall rack on the base. Specifically, the through hole of the wall rack 4 allows the wall mounting piece 3 to pass therethrough and the wall rack 4 is hung on the wall mounting piece 3. As will be described in detail below with reference to FIG. 4, each of the through holes 400 is constituted by a mounting hole 401 and a limiting hole 402 which are communicated with each other, and the wall rack 4 allows the wall mounting piece 3 to pass through the mounting hole 3, so that the wall rack 4 is hung on the wall mounting piece 3 through the limiting hole 402. In addition, the wall rack 4 also comprises a member for fixing the display. The member may be, for example, a screw hole 404 and a screw hole 406 shown in FIG. 4. The wall rack 4 can be fastened to the back of the display by means of screws and the screw holes 404, 406. It will be appreciated that the member may also be implemented by other means, such as snap fit, elastic member, and the like. It will be appreciated that, in addition to the display, the wall mounting apparatus according to the present application may also be used to secure other planar objects at a particular height, such as a tablet.

Continually referring to FIG. 1, the substrate 1 shown in FIG. 1 is provided with six positioning holes 101, and the front trim panel 2 is provided with six holes 201 corresponding to the positions of the positioning holes 101. Also shown in FIG. 1 are six wall mounting pieces 3, each of which can be secured to the corresponding positioning hole 101 by a threaded connection. As shown in FIG. 1, the positioning holes 101 in the base are arranged in two rows, each of which is provided with three positioning holes 101, and the three positioning holes 101 may have a same pitch. In this case, correspondingly the wall mounting pieces 3 are also arranged in two rows, and two adjacent wall mounting pieces 3 in each row may be connected to a wall rack 4 having two through holes 400. In practice, the two through holes 400 of a wall rack 4 are passed through by the two adjacent wall mounting pieces 3 which are in a same row, respectively, to realize the connection between the wall rack and the two wall mounting pieces.

As shown in FIG. 1, a wall rack can be connected to two upper or two lower ones of the wall mounting pieces in a row. In order to ensure that the wall racks connected to the wall mounting pieces are kept at the same height, different wall racks are connected to the wall mounting pieces at different rows and at a same line.

As shown in FIG. 1, the upper two wall mounting pieces in one row in a vertical direction form the two sets of wall mounting pieces 501, 502 of the first height, and the lower two wall mounting pieces form two sets of wall mounting pieces 601, 602 of the second height. As previously described, the wall rack 4 comprises two through holes 400 which can be used to hang the wall rack 4 at the two sets of wall mounting pieces 501, 502 of the first height or the two sets of wall mounting pieces 601, 602 of the second height. Accordingly, the display mounted on the wall mounting piece can thus be arranged at the first height or the second height.

Figure 2:
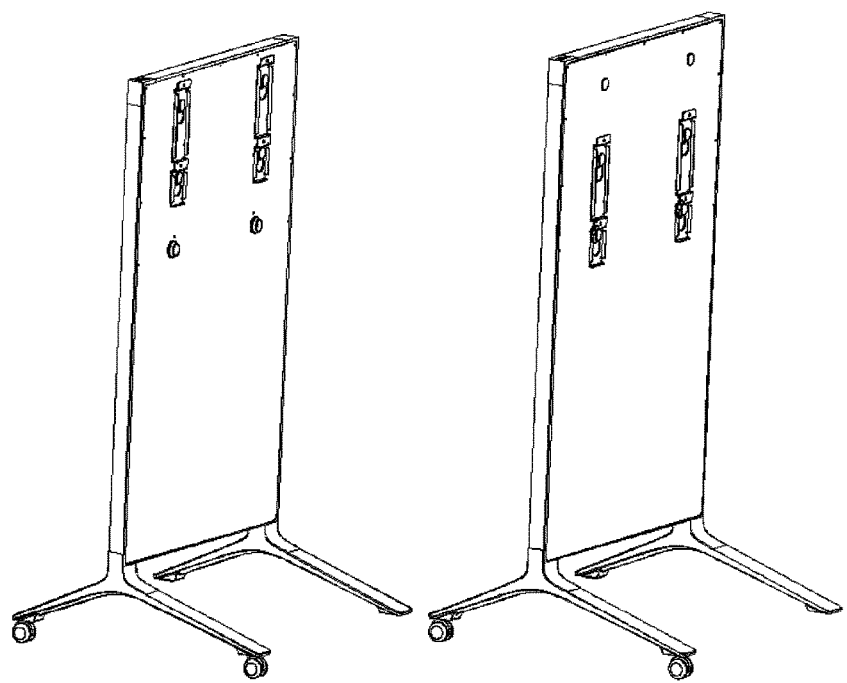
FIG. 2 is a perspective view showing different mounting heights of wall racks which are hanged on different groups of wall mounting pieces according to at least one embodiment of the present application.

FIG. 2 is a schematic view showing different mounting heights of wall racks which are hanged on different sets of wall mounting pieces according to an embodiment of the present application. As shown in the left portion of FIG. 2, the first height is defined when the wall rack is secured to the upper two sets of wall mounting pieces, and the second height is defined when the wall rack is secured to the lower two sets of wall mounting pieces. However, it will be understood by those skilled in the art that a plurality of positioning holes, such as six or more positioning holes, may be provided on the base. In other embodiments, four positioning holes may be provided in each row to define three different mounting heights. Embodiments of the present application may be implemented on a wall, but as shown in FIG. 2, the wall mounting apparatus in this embodiment is implemented as a movable apparatus. By way of example, the substrate 1 also comprises a leg for supporting the plate-like structure, and the leg has a roller. It is to be understood that the base may also be a body having any other shape. This configuration allows the base to be flexibly moved on the ground so that the horizontal position of the display can be adjusted as required. The mobility of the display can be increased by fixing the display to the wall of the movable base, compared to the case of fixing the display to a fixed wall.

Figure 3:
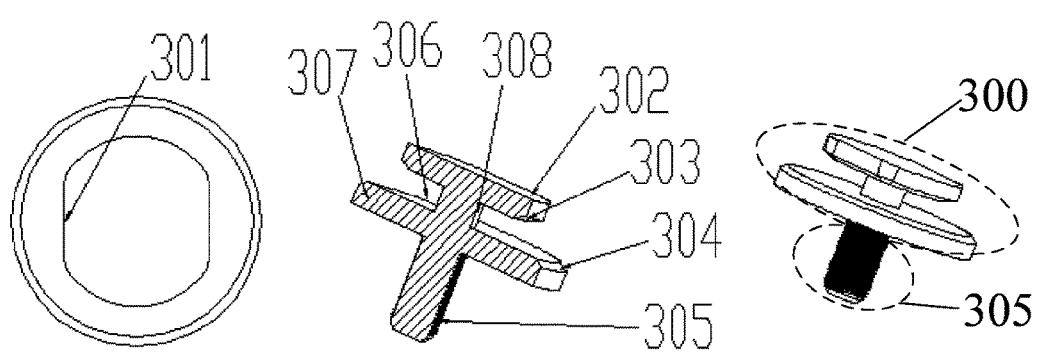
FIG. 3 is a schematic structural view showing a wall mounting piece according to at least one embodiment of the present application, including a front view, a cross-sectional view and a perspective view.

FIG. 3 is a schematic view showing a structure of a wall mounting piece according to an embodiment of the present application. The left portion of FIG. 3 shows a top view of the wall mounting piece 3, the middle portion shows a cross-sectional view of the wall mounting piece 3, and the right portion shows a perspective view of the wall mounting piece. As shown in the illustration of the right portion, the wall mounting piece 3 may be formed by two parts, such as a threaded portion 305 and a head portion 300 connected to the threaded portion, as indicated by the dashed coil. As shown in the illustration of the intermediate portion, the head portion 300 of the wall mounting piece comprises a first flange 302 at the end of the wall mounting piece, a second flange 307 adjacent to the threaded portion 305, and a hanging shaft 308 between the first flange 302 and the second flange 307. The hanging shaft 308 and the first flange 302 and the second flange 307 are combined with each other to define a limiting slot 306. The edges of the first flange 302 and the second flange 307 may be formed with chamfers 303, 304 so that the wall mounting piece 4 is easily fitted into the mounting hole 401 in the wall rack 4. As shown in the illustration of the left portion, the first flange 302 may be formed with two straight and parallel sides 301, instead of circular arcs, resulting in such a shape that the wall mounting piece 3 is easily mounted and disassembled from the base. Alternatively, the first flange 302, which initially has a circular sectional shape, may be cut to obtain two parallel sides.

Figure 4:
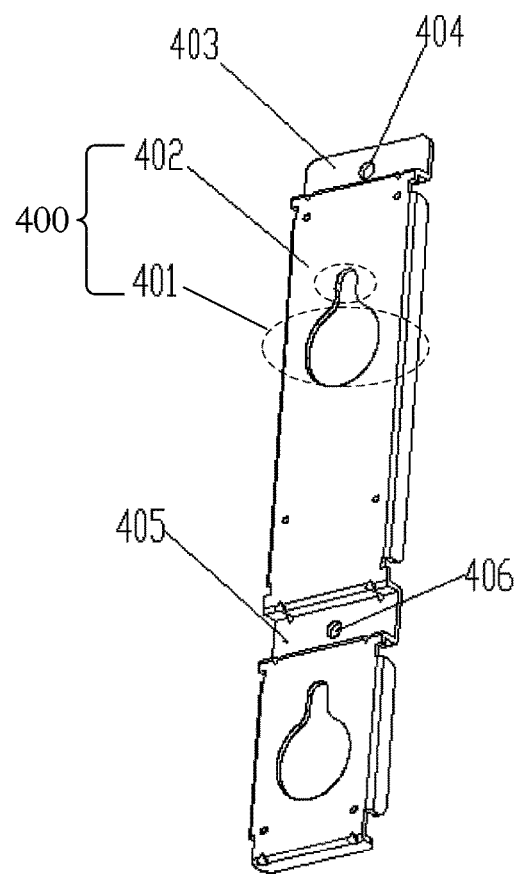
FIG. 4 is a perspective structural view showing a wall rack according to at least one embodiment of the present application.

FIG. 4 is a schematic view showing a structure of a wall rack 4 according to an embodiment of the present application. As shown in FIG. 4, the wall rack 4 comprises a bottom plane member, and a top plane member 403 and a top plane member 405 projecting upward from one end and an intermediate portion of the bottom plane member respectively. The top plane member 403 and the top plane member 405 are provided with a screw hole 404 and a screw hole 406 for locking the display. Screws and the screw holes 404, 406 can be used to secure the wall rack to the back of the display. In the figure, two upper and lower through holes 400 are formed on the bottom plane member. The through hole 400 is formed by a mounting hole 401 and a limiting hole 402 which are communicated with each other, as shown by a dashed circle. Wherein the mounting hole 401 is located below the limiting hole 402 and the size of the mounting hole 401 is larger than the size of the limiting hole 402.

Figure 5:
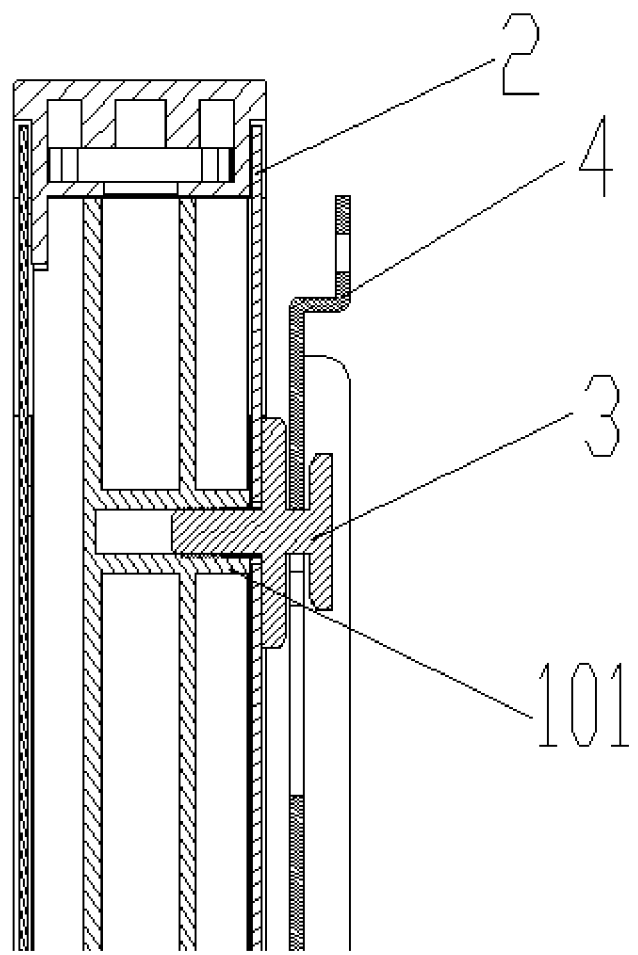
FIG. 5 is a cross-sectional view showing a state in which a wall rack is hanged on a wall mounting piece according to at least one embodiment of the present application.

FIG. 5 is a schematic view showing a state in which a wall rack is hung on a wall mounting piece according to an embodiment of the present application. As previously described, the two through holes 400 of the wall rack 4 may cooperate with the corresponding two wall mounting pieces 3 to secure the wall rack 4 relative to the base. Referring to FIG. 5, the mounting hole 401 of the wall rack 4 allows the first flange 302 of the wall mounting piece 3 to pass therethrough so that the limiting hole 402 of the wall rack 4 is hung on the hanging shaft 308 of the wall mounting piece 3. Of course, the wall rack 4 may be in a state of being separated from the wall mounting piece 3.

As shown in FIGS. 3 and 4, according to an embodiment of the present application, the size of the mounting hole 401 is larger than the size of the first flange 302 and smaller than the size of the second flange 307, so that the first flange 302 is able to pass through the mounting hole 401 and the second flange is sandwiched between the front trim panel 2 and the wall rack, for using as a buffer plane and an isolation plane. For example, the diameter of the mounting hole 401 is larger than the diameter of the first flange 302 and smaller than the diameter of the second flange 307. The size of the limiting hole 402 is larger than the size of the hanging shaft 308 so that the limiting hole 402 is able to be hung on the hanging shaft 308 of the wall mounting piece 3. For example, the diameter of the limiting hole 402 is larger than the diameter of the hanging shaft 308.

Further, referring to FIGS. 1, 3 and 5, each of the plurality of wall mounting pieces 3 has a threaded portion 305, which is substantially perpendicular to a front surface of the base, and orthographic projections of the threaded portions 305 of the plurality of wall mounting pieces 3 on the front surface of the base are spaced apart from each other.

Various modifications and variations of the foregoing exemplary embodiments of the present application will become apparent to those skilled in the art upon reading the foregoing description in conjunction with the accompanying drawings. It is therefore to be understood that the embodiments of the present application are not limited to the specific embodiments, and that modifications and other embodiments are intended to be included within the scope of the appended claims.

The invention claimed is:

1. A wall mounting apparatus comprising:
   a base provided with a plurality of positioning holes (101);
   a plurality of wall mounting pieces (3) having a one to one correspondence with the plurality of positioning holes, each of said wall mounting pieces (3) being detachably connected to one of said plurality of positioning holes (101);
   multiple wall racks (4) independent of the base, each of said wall racks (4) comprising at least two through holes and being configured to be hanged on the base by a corresponding connection of said through hole and said wall mounting piece, the multiple wall racks being substantially parallel to each other and hanged on the base, each of the wall racks further comprising a screw hole for securing a display,
   wherein each of the plurality of wall mounting pieces has a threaded portion which is substantially perpendicular to a front surface of the base, and orthographic projections of the threaded portions of the plurality of wall mounting pieces on the front surface of the base are spaced apart from each other.

2. The wall mounting apparatus according to claim 1, wherein the base comprises at least six positioning holes (101), the at least six positioning holes (101) being arranged in two rows;
   various through holes on each of said wall racks are equally spaced on a row; and the positioning holes located in a row are equally spaced, and the spacing between two adjacent positioning holes on one row is equal to the spacing between two adjacent through holes on one row.

3. The wall mounting apparatus according to claim 1, wherein the base comprises a substrate (1) and a front trim panel (2), the substrate (1) and the front trim panel (2) being detachably connected.

4. The wall mounting apparatus according to claim 3, wherein the substrate (1) and the front trim panel (2) are plate-like and the front trim panel (2) is secured to the substrate (1) by a connection between the positioning holes (101) and the wall mounting pieces (3).

5. The wall mounting apparatus according to claim 1, wherein the positioning hole (101) is a threaded hole,
   each said wall mounting piece (3) has a head portion (300) connected to the threaded portion (305).

6. The wall mounting apparatus according to claim 5, wherein
   the head portion (300) of each said wall mounting piece comprises a first flange (302) located at an end of each said wall mounting piece, a second flange (307) adjacent to the threaded portion (305), and a hanging shaft (308) located between the first flange (302) and the second flange (307), and the first flange (302) is dimensioned to be able to pass through the through hole (400) and the second flange (307) is dimensioned to be unable to pass through the through hole (400).

7. The wall mounting apparatus according to claim 6, wherein
   the through hole (400) of the wall rack (4) is formed by interconnected mounting hole (401) and limiting hole (402), wherein the mounting hole (401) is located below the limiting hole (402) and the size of the mounting hole (401) is larger than the size of the limiting hole (402),
   wherein the size of the mounting hole (401) is larger than the size of the first flange (302) and smaller than the size of the second flange (307), and the size of the limiting hole (402) is larger than the size of the hanging shaft (308).

8. The wall mounting apparatus according to claim 6, wherein the edge of the first flange (302) has a chamfer (303).

9. The wall mounting apparatus according to claim 6, wherein the first flange (302) has at least two sides (301) parallel to each other.

10. The wall mounting apparatus according to claim 4, wherein the base (1) further comprises legs for supporting the substrate and the front trim panel, the leg being provided with a roller.

11. The wall mounting apparatus according to claim 4, wherein
    the wall rack (4) comprises a bottom plane member and a top plane member (403, 405) protruding from the bottom plane member, wherein the through hole is formed in the bottom plane member, and the top plane member is provided with members for fixing the display.

12. A display device comprising a display and a wall mounting apparatus according to claim 1.

13. The display device according to claim 12, wherein the display is secured to the wall rack of the wall mounting apparatus and the wall rack is able to be in one of a state of being hanged on the base and a state of being separated from the base.

14. A display device comprising a display and a wall mounting apparatus according to claim 2.

15. A display device comprising a display and a wall mounting apparatus according to claim 3.

16. A display device comprising a display and a wall mounting apparatus according to claim 4.

17. A display device comprising a display and a wall mounting apparatus according to claim 5.

18. A display device comprising a display and a wall mounting apparatus according to claim 6.

19. A display device comprising a display and a wall mounting apparatus according to claim 7.

20. A display device comprising a display and a wall mounting apparatus according to claim 8.

* * * * *